US009502739B2

(12) United States Patent
Han et al.

(10) Patent No.: US 9,502,739 B2
(45) Date of Patent: Nov. 22, 2016

(54) BATTERY PACK

(71) Applicant: Samsung SDI Co., Ltd., Yongin-si, Gyeonggi-Do (KR)

(72) Inventors: Jung-Yup Han, Yongin-Si (KR); No-Hyun Kwag, Yongin-si (KR); Kyung-Won Seo, Yongin-si (KR); Jeong-Deok Byun, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/636,956

(22) Filed: Mar. 3, 2015

(65) Prior Publication Data

US 2015/0180093 A1 Jun. 25, 2015

Related U.S. Application Data

(62) Division of application No. 12/955,702, filed on Nov. 29, 2010, now Pat. No. 8,999,541.

(30) Foreign Application Priority Data

Nov. 27, 2009 (KR) ........................ 10-2009-0115918

(51) Int. Cl.
*H01M 10/48* (2006.01)
*H01M 2/10* (2006.01)
(Continued)

(52) U.S. Cl.
CPC ......... *H01M 10/482* (2013.01); *H01M 2/1061* (2013.01); *H01M 2/1077* (2013.01); *H01M 2/20* (2013.01); *H01M 2/204* (2013.01); *H01M 2/206* (2013.01); *H01M 2/30* (2013.01);
(Continued)

(58) Field of Classification Search
CPC ........... H01M 10/482; H01M 10/425; H01M 2/1061; H01M 2/1077; H01M 2/20; H01M 2/204; H01M 2/206
USPC .............................................. 429/82, 90, 99
See application file for complete search history.

(56) References Cited

U.S. PATENT DOCUMENTS 6,146,788 A 11/2000 Ikeda et al.
2004/0043669 A1 3/2004 Aramoto et al.
(Continued)

FOREIGN PATENT DOCUMENTS

CN 2558088 * 6/2003 ............. H01M 2/10
CN 2558088 Y 6/2003
(Continued)

OTHER PUBLICATIONS

Third Chinese Office Action dated Mar. 10, 2015 for Chinese Patent Application No. CN 201010551752.9, which shares priority of Korean Patent Application No. KR 10-2009-0115918 with captioned U.S. Appl. No. 14/636,956.
(Continued)

*Primary Examiner* — Karie O'Neill Apicella
(74) *Attorney, Agent, or Firm* — Knobbe, Martens, Olson & Bear, LLP

(57) ABSTRACT

A battery pack is disclosed. One aspect includes a battery pack module having a housing and a plurality of battery packs, each pack housing a case in which a plurality of batteries are received, an electrode tab to connect the batteries to form one unit, and a data wire having a first end connected to the electrode tab, to act as a signal transmitting line of the plurality of batteries.

12 Claims, 5 Drawing Sheets

(51) Int. Cl.
*H01M 2/12* (2006.01)
*H01M 2/20* (2006.01)
*H01M 2/30* (2006.01)
*H01M 10/42* (2006.01)
*H01M 10/625* (2014.01)
*H01M 10/643* (2014.01)
*H01M 10/6554* (2014.01)
*H01M 10/627* (2014.01)
*H01M 10/613* (2014.01)
*H01M 10/6562* (2014.01)

(52) U.S. Cl.
CPC ....... *H01M 10/425* (2013.01); *H01M 10/486* (2013.01); *H01M 10/613* (2015.04); *H01M 10/625* (2015.04); *H01M 10/627* (2015.04); *H01M 10/643* (2015.04); *H01M 10/6554* (2015.04); *H01M 10/6562* (2015.04); *H01M 2220/10* (2013.01)

(56) References Cited

U.S. PATENT DOCUMENTS

| | | |
|---|---|---|
| 2008/0286647 A1 | 11/2008 | Naito |
| 2009/0022206 A1 | 1/2009 | Shibuya et al. |
| 2009/0035658 A1* | 2/2009 | Harada ............... H01M 2/206 429/211 |
| 2009/0072785 A1 | 3/2009 | Moon |

FOREIGN PATENT DOCUMENTS

| | | | |
|---|---|---|---|
| CN | 1489246 | A | 4/2004 |
| CN | 101164181 | A | 4/2008 |
| CN | 101527375 | A | 9/2009 |
| EP | 1 780 825 | A1 | 5/2007 |
| EP | 2 099 085 | A2 | 9/2009 |
| EP | 2 207 223 | A1 | 7/2010 |
| JP | 11-120988 | A | 4/1999 |
| JP | 2000-182583 | A | 6/2000 |
| JP | 2001-057192 | A | 2/2001 |
| JP | 2003-142052 | A | 5/2003 |
| JP | 2003-242950 | A | 8/2003 |
| JP | 2004-164981 | A | 6/2004 |
| JP | 2005-285459 | A | 10/2005 |
| JP | 2007-200758 | A | 8/2007 |
| JP | 2008-251472 | A | 10/2008 |
| JP | 2009-218011 | A | 9/2009 |
| KR | 10-0863729 | B1 | 10/2008 |
| WO | WO 2008/095315 | A1 | 8/2008 |

OTHER PUBLICATIONS

European Search Report dated Mar. 31, 2011 for European Patent Application No. EP 10191713.6 which shares priority of Korean Patent Application No. KR 10-2009-0115918 with captioned U.S. Appl. No. 12/955,702.
Korean Office Action dated Apr. 20, 2011 for Korean Patent Application No. KR 10-2009-0115918 which corresponds to captioned U.S. Appl. No. 12/955,702.
European Search Report dated Nov. 8, 2011 for European Patent Application No. EP 10 19 1713.6 which shares priority of Korean Patent Application No. KR 10-2009-0115918 with captioned U.S. Appl. No. 12/955,702.
Japanese Office Action dated Jan. 29, 2013 for Japanese Patent Application No. JP 2010-168006 which shares priority of Korean Patent Application No. KR 10-2009-0115918 with captioned U.S. Appl. No. 12/955,702.
Japanese Office Action dated May 21, 2013 for Japanese Patent Application No. JP 2010-168006 which shares priority of Korean Patent Application No. KR 10-2009-0115918 with captioned U.S. Appl. No. 12/955,702.
Chinese Office Action dated Jan. 24, 2014 for Chinese Patent Application No. CN 201010551752.9 which shares priority of Korean Patent Application No. KR 10-2009-0115918 with captioned U.S. Appl. No. 12/955,702.
Chinese Office Action dated Sep. 16, 2014 for Chinese Patent Application No. CN 201010551752.9, which shares priority of Korean Patent Application No. KR 10-2009-0115918 with captioned U.S. Appl. No. 12/955,702.
Fourth Chinese Office Action dated Aug. 20, 2015 for Chinese Patent Application No. CN 201010551752.9, which shares priority of Korean Patent Application No. KR 10-2009-0115918 with captioned U.S. Appl. No. 14/636,956.
Fifth Chinese Office Action dated Jan. 26, 2016 for Chinese Patent Application No. CN 201010551752.9, which shares priority of Korean Patent Application No. KR 10-2009-0115918 with captioned U.S. Appl. No. 14/636,956.

* cited by examiner

BATTERY PACK

CROSS-REFERENCE TO RELATED APPLICATIONS

This application is a divisional of U.S. patent application Ser. No. 12/955,702 filed on Nov. 29, 2010, which claims the benefit of Korean Patent Application No. 10-2009-0115918, filed on Nov. 27, 2009, in the Korean Intellectual Property Office, the disclosure of which is incorporated herein, by reference.

BACKGROUND

1. Field

One or more embodiments of the present invention relate to a battery pack, in which a plurality of batteries are connected to one another as one unit.

2. Description of the Related Art

A battery pack is a power supply unit manufactured by connecting a plurality of batteries. For example, a battery pack may be employed in a large capacity power supply device, such as an uninterruptible power supply (UPS), to supply power to equipment when external power is not supplied to the equipment. Since a high capacity power supply device, such as a UPS, includes a plurality of interconnected battery packs, it also includes a battery management system for monitoring the voltage, current, and temperature of each of the battery packs, in order to smoothly operate each of the battery packs.

Accordingly, such a power supply device includes signal transmitting lines for sending information about voltage, current, and temperature to the controller, for each of the battery packs. Unless the signal transmitting lines are efficiently formed, the structures of the battery packs may be complicated, and the battery packs may not be easily assembled.

SUMMARY

One or more embodiments of the present invention include a battery pack having a simple structure to transmit a signal to a controller.

One or more embodiments of the present invention include a battery pack that is easy to assemble and has improved heat dissipation efficiency.

According to one or more embodiments of the present invention, a battery pack includes: a case in which a plurality of batteries are received; an electrode tab connecting electrodes of the batteries as one unit; and a data wire having a first end connected to the electrode tab, to act as a signal transmitting line for the plurality of batteries.

According to one or more embodiments, the first end of the data wire may have a ring terminal coupled to the electrode tab using screws. The first end of the data wire may be soldered to the electrode tab.

According to one or more embodiments, a connector, to which a second end of the data wire is connected, may be installed in the case. A plug to send a signal to a controller may be inserted into the connector.

According to one or more embodiments, the battery pack may further include a thermistor wire to transmit an internal temperature signal with respect to the case. The thermistor wire is also connected to the connector. Signals transmitted through the data wire may include voltage and current signals from the plurality of batteries.

Vent holes to ventilate the battery pack may be formed in the case. A sliding rib may be disposed on an outer surface of the case, so as to be slidably inserted into an insertion groove of a module.

According to one or more embodiments, the case may include an upper case and a lower case, which are detachably coupled to each other. The battery pack may further include a coupling guide mechanism to insure proper coupling of the upper and lower cases.

According to one or more embodiments, the coupling guide mechanism may include a coupling rib having an asymmetric shape, formed on one of the upper and lower cases, and a coupling groove formed in the other of the upper and lower cases, into which the coupling rib is inserted. The coupling rib and the coupling groove insure that the upper and lower cases are coupled to each other only at desired positions.

According to one or more embodiments, the coupling rib may have a height that increases from a first side of the case to a second side of the case. The coupling groove may have a depth that increases from the first side to the second side of the case, so as to allow the coupling rib to be fully inserted into the coupling groove. The upper case and the lower case may be coupled to each other using screws.

According to the one or more embodiments of the present invention, the battery pack has a simplified structure. The battery pack may be easily assembled, because a data wire connected to an electrode tab is used as a signal transmitting line.

According to one or more embodiments, the battery pack has a high heat dissipation efficiency, because vent holes are formed in a case of the battery pack. The battery pack may be easily assembled, because the battery pack includes a structure that properly aligns the upper and lower cases during coupling.

According to one or more embodiments, a module is easily assembled, because battery packs are slidably coupled to the module.

Additional aspects and/or advantages of the present disclosure will be set forth in part in the description which follows and, in part, will be obvious from the description, or may be learned by practice of the present teachings.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION

Figure 1:
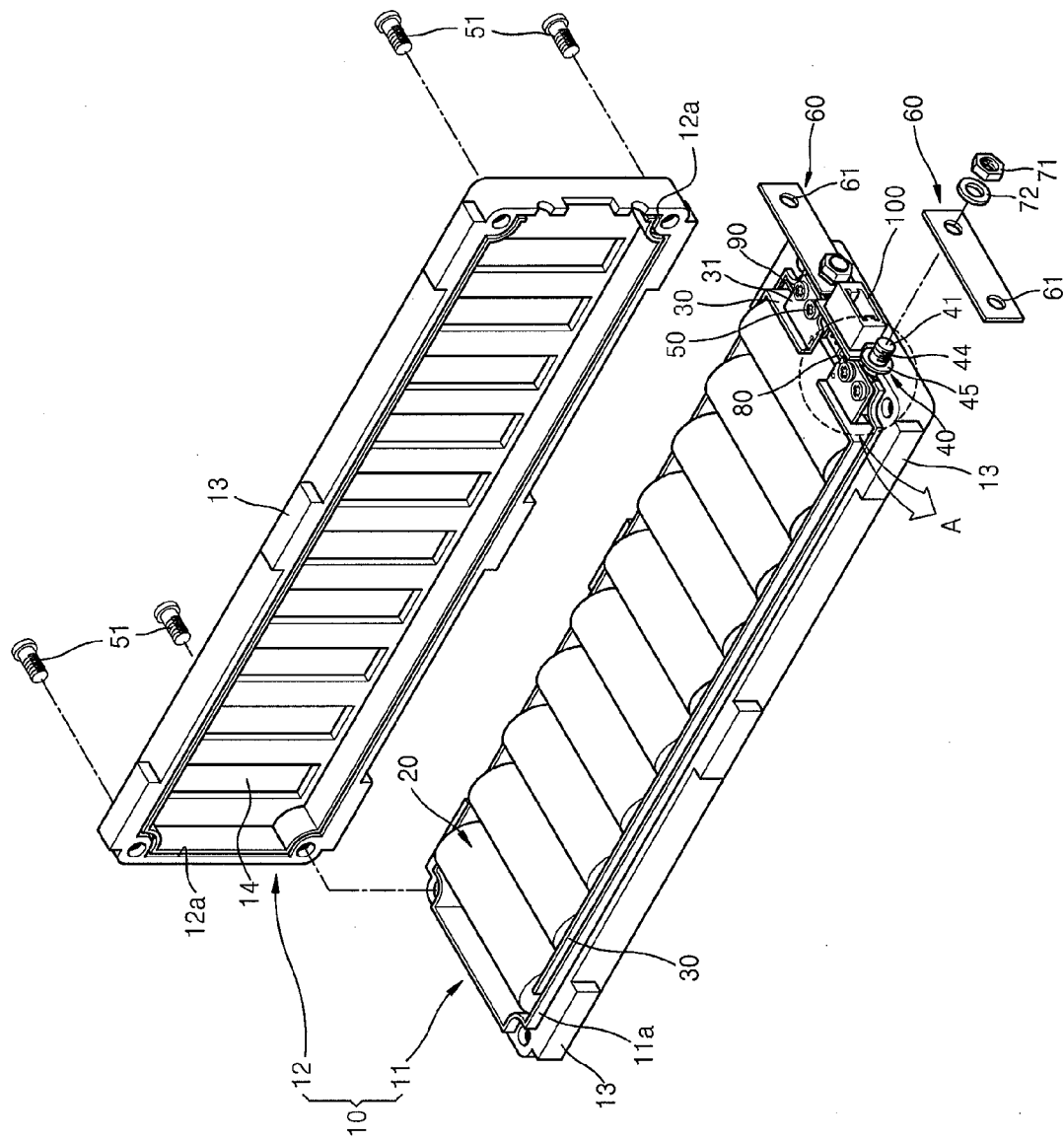
FIG. 1 is a perspective view of a battery pack, according to an exemplary embodiment of the present invention.

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

Figure 2:
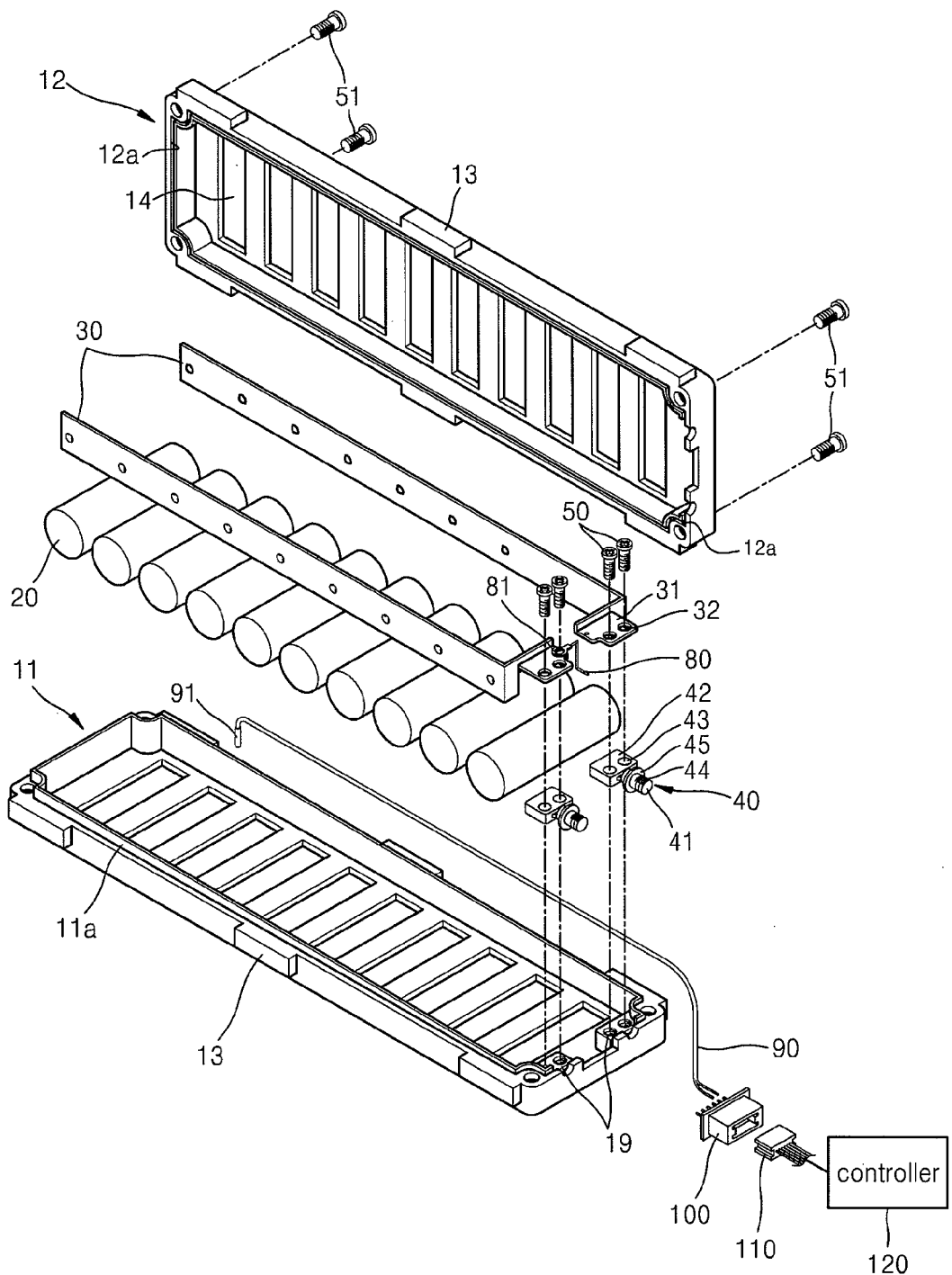
FIG. 2 is an exploded perspective view of the battery pack of FIG. 1.
Figure 4:
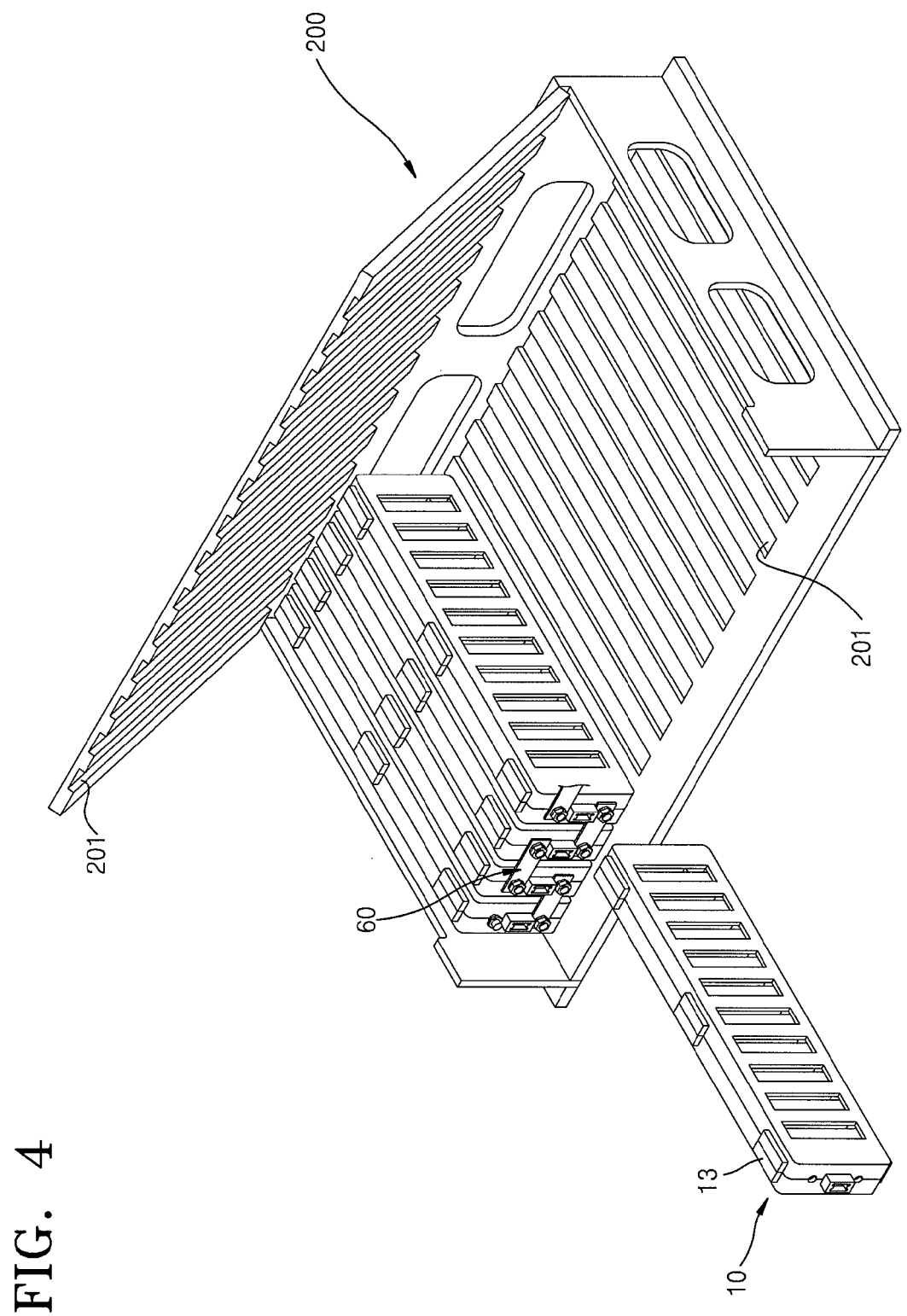
FIG. 4 is a perspective view illustrating a module into which the battery pack of FIG. 1 is inserted.

FIG. 1 is a perspective view of an assembled battery pack, according to an embodiment of the present invention. FIG. 2 is an exploded perspective view of the battery pack of FIG. 1. Referring to FIGS. 1 and 2, the battery pack includes: a case 10 in which a plurality of batteries 20 are received; electrode tabs 30 connecting electrodes of the plurality of batteries 20 as one unit; a data wire 80 having one end connected to the electrode tab 30, acting as a signal transmitting line of the plurality of batteries 20; and a thermistor wire 90 acting as a signal transmitting line to transmit temperature information with respect to the case 10. An external terminal 40 is coupled to one of the electrode tabs 30 using screws 50 and transmits current between the batteries 20 and an element connected to the battery pack. A bus bar 60 is coupled to the external terminal 40 using a nut 71 and a washer 72, so that the battery pack may be connected to an adjacent battery pack in series or in parallel, as shown in FIG. 4. The battery pack also includes a sliding rib 13, which will be explained later.

Although the batteries 20 are shown as cylindrical secondary batteries in FIGS. 1 and 2, the present embodiment is not limited thereto. For example, the batteries 20 may be any of other type of battery, for example, angular secondary batteries. The batteries 20 are connected in parallel by the electrode tabs 30, such that anodes each form one unit and cathodes each form one unit. Of course, the batteries 20 may be connected in series in some aspects.

The case 10 includes an upper case 12 and a lower case 11. Vent holes 14 are formed in the case 10 at positions respectively corresponding to the batteries 20. Since the batteries 20 are in direct contact with external air through the vent holes 14, heat dissipation efficiency may be improved.

Since the upper case 12 and the lower case 11 are detachably coupled to each other using screws 51, the case 10 may be easily removed. In addition, elements inside of the battery pack may be easily repaired, if necessary.

A coupling rib 11a is formed on the lower case 11, and a coupling groove 12a is formed in the upper case 12. The coupling rib 11a may be inserted into the coupling groove 12a. The coupling rib 11a and the coupling groove 12a collectively serve as a coupling guide mechanism to properly align the upper and lower cases 12 and 11 during coupling. That is, the coupling rib 11a has a height that decreases toward the external terminal 40 and that increases away from the external terminal 40. The coupling groove 12a has a depth that decreases toward the external terminal 40 and that increases away from the external terminal 40. Accordingly, the upper and lower cases 12 and 11 may be easily coupled to each other at a desired position.

If the upper and lower cases 12 and 11 are coupled to each other such that a portion of the upper case 12 having a relatively greater depth is coupled to a portion of the lower case 11 having a relatively lower height, the upper and lower cases 12 and 11 will not be properly coupled to each other. Accordingly, when the upper and the lower cases 12 and 11 are coupled to each other in such a manner that a portion of the upper case 12 having a relatively great depth is coupled to a portion of the lower case 11 having a relatively great depth, the upper and lower cases 12 and 11 may be coupled properly. Alternatively, since the coupling rib 11a and the coupling groove 12a are complementary to each other, a coupling groove may be formed in the lower case 11 and a coupling rib may be formed on the upper case 12.

The electrode tab 30 is generally formed of a metal material, such as nickel, and may be welded to the electrodes of the batteries 20. A terminal connecting part 31 is coupled to the external terminal 40 using the screws 50. The terminal connecting part 31 is disposed on an end of the electrode tab 30, so that the electrode tab 30 may be coupled to the external terminal 40 and the case 10, when the screws 50 are inserted into through-holes 32 of the terminal connecting part 31 and screw grooves 19 of the case 10. The data wire 80 has a ring terminal 81 that is coupled to the terminal connecting part 31 using the screws 50, as will be explained later.

The external terminal 40 includes an inner terminal 42, in which through-holes 43 are formed, and an external terminal 41 that projects outward. The external terminal 41 has a screw surface 44 around which the nut 71 is fitted. A contacting part 45 is disposed on the external terminal 40 in contact with the bus bar 60, when the bus bar 60 is coupled to the external terminal 40 using the nut 71.

Ends of the data wire 80 and the thermistor wire 90 are connected to a connector 100. Accordingly, once a plug 110 connected to a controller 120 is inserted into the connector 100, the controller 120 may receive and process signals transmitted through the data wire 80 and the thermistor wire 90.

The thermistor wire 90 is a conductive member, and has a first end which is connected to the connector 100, and a second end on which a thermistor 91 is installed. The thermistor measures the internal temperature of the case 10 and outputs a corresponding signal, which is transmitted to the controller 120 through the thermistor wire 90, the connector 100, and the plug 110. That is, when the plug 110 is inserted into the connector 100, the controller 120 may receive and process temperature signals. Therefore, a separate line for measuring temperature is not needed.

The data wire 80 is a conductive member connected to the electrode tab 30 and the connector 100. The data wire 80 may relay an information signal with respect to the batteries 20.

Figure 3A:
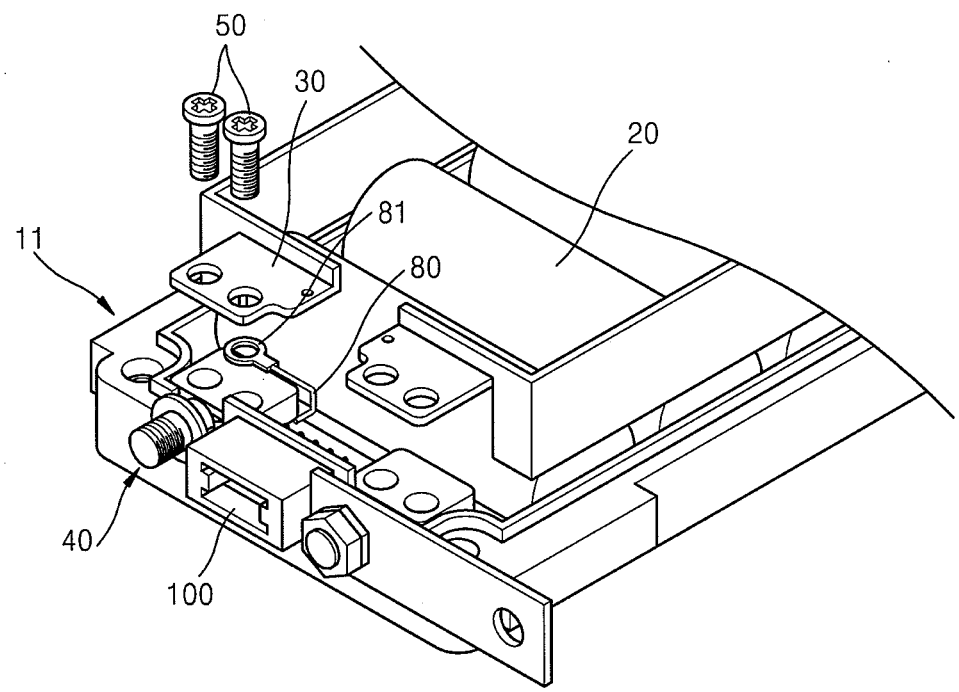
FIGS. 3A and 3B are enlarged perspective views illustrating a portion A of the battery pack of FIG. 1.
Figure 3B:
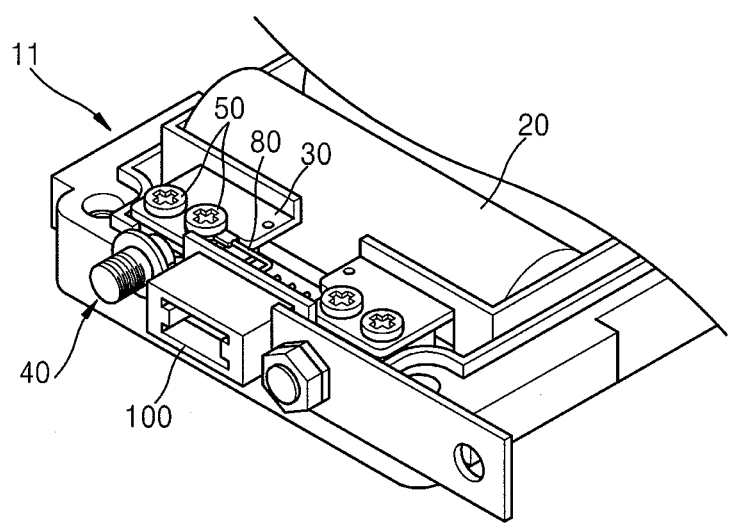

FIGS. 3A and 3B are enlarged perspective views illustrating a portion A of the battery pack shown in FIG. 1. Referring to FIGS. 3A and 3B, the ring terminal 81 disposed on the second end of the data wire 80 is coupled to the terminal connecting part 31 of the electrode tab 30, using the screws 50. The second end of the data wire 80 is connected to the connector 100. Accordingly, when the plug 110 is inserted into the connector 100, the controller 120 may receive and process an information signal with respect to the batteries 20, without installing a separate data signal line.

The information signal with respect to the batteries 20 may be a voltage information signal, a current information signal, or the like. Accordingly, once the plug 110 is inserted into the connector 100, since the battery voltage, current, and temperature information signals may be directly transmitted to the controller 120, conditions (the state) of the battery pack may be recognized, and the structure of the battery pack may be simplified, such that there is no need to install a separate line.

FIG. 4 is a perspective view of a module (battery pack module) into which the battery packs of FIG. 1 may be inserted. Referring to FIG. 4, a plurality of the battery packs are connected in series or in parallel and inserted into a housing 200. The module may be referred to as a high capacity power supply unit. The sliding rib 13 of the case 10 is inserted into an insertion groove 201 of the housing 200.

The sliding rib 13 slides along the insertion groove 201, thereby making it possible to easily insert the battery pack into the housing 200.

Although the ring terminal 81 is used as a structure for coupling the data wire 80 to the electrode tab 30 in FIG. 1, the present disclosure is not limited thereto. For example, any suitable structures may be adopted.

Figure 5A:
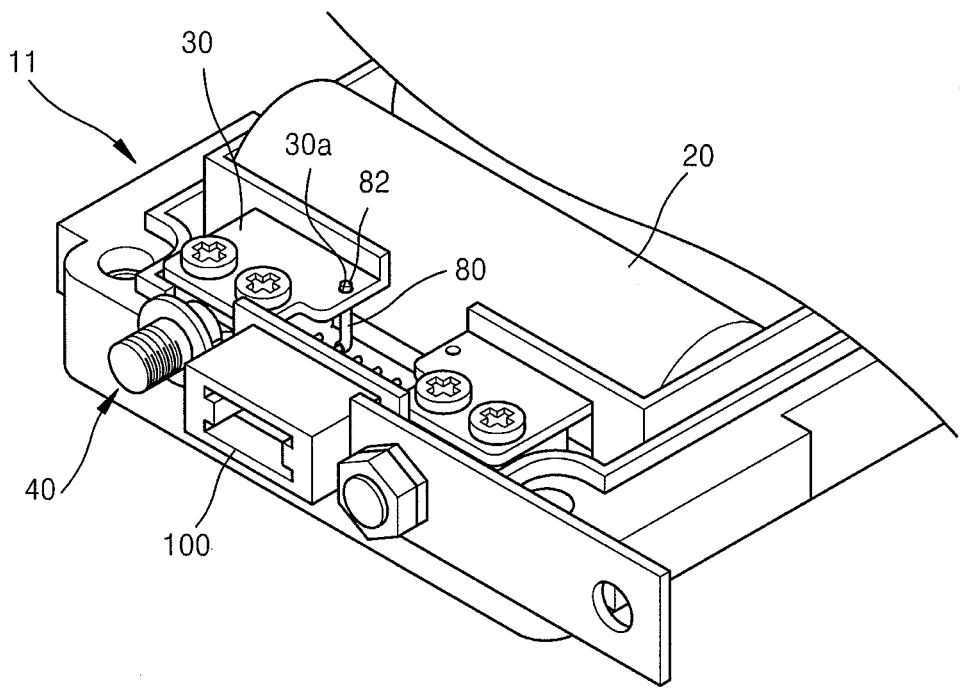
FIGS. 5A and 5B are perspective views illustrating a modification of a structure for coupling a data wire to an electrode tab, in the battery pack of FIG. 1.
Figure 5B:
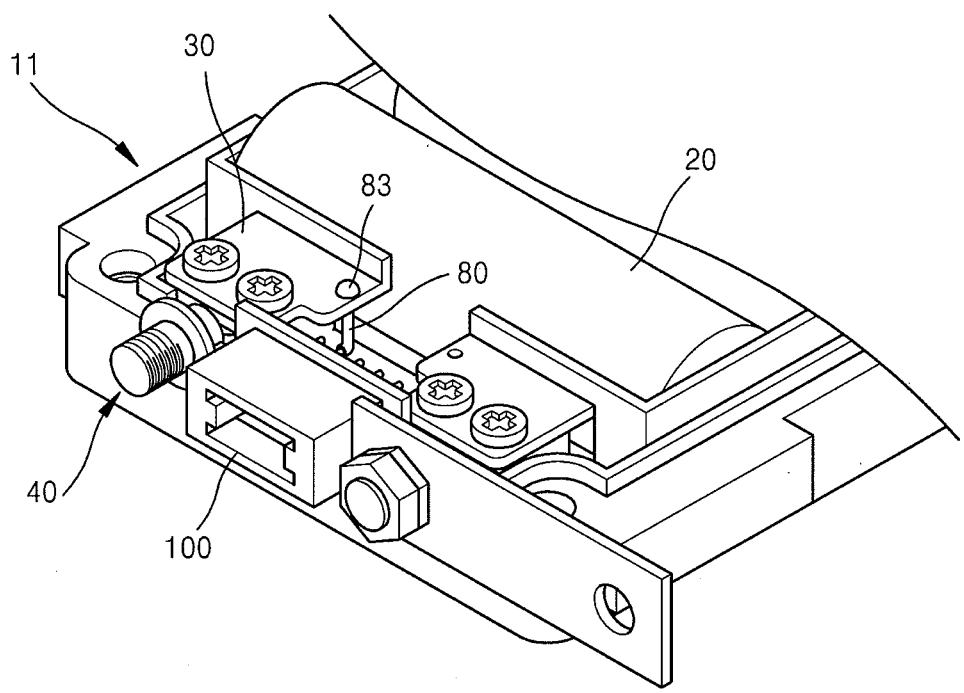

FIGS. 5A and 5B are perspective views illustrating a modification of the structure for coupling the data wire 80 to the electrode tab 30, in the battery pack of FIG. 1. The structure of FIGS. 5A and 5B uses soldering instead of the ring terminal 81 (see FIG. 3A). That is, the second end 82 of the data wire 80 is inserted into a hole 30a formed in the electrode tab 30 and then is soldered thereto. The first end of the data wire 80 is connected to the connector 100 in the same manner as that of FIG. 1. Since data signals, e.g., voltage and current information signals of the batteries 20, may be transmitted to the controller 120, through the data wire 80, the connector 100, and the plug 110, a separate line is not necessary, thereby simplifying the structure of the battery pack. Parts other than those of the structure of coupling the data wire 80 to the electrode tab 30 are the same as those of the battery pack of FIG. 1.

As described above, according to the one or more exemplary embodiments of the present invention, since a data wire connected to an electrode tab is used as a signal transmitting line, the structure of a battery pack is simplified, and the battery pack is easily assembled.

Furthermore, since vent holes are formed in a case of the battery pack, heat dissipation efficiency may be improved. Since a coupling guide mechanism for enabling upper and lower cases to be properly coupled together is included, the battery pack may be stably assembled. Moreover, since a plurality of battery packs are slidably coupled to a module, the module may be easily assembled.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A battery pack module comprising:
a housing comprising a plurality of slots;
a plurality of battery packs inserted into the housing and electrically connected to one another, each battery pack comprising:
a plurality of batteries;
a case housing the batteries, having sliding ribs to mate with the slots;
electrode tabs to electrically connect the batteries;
a connector disposed on the case; and
a single data wire connected to one of the electrode tabs and a plug, to transmit voltage information and current information signals from the batteries to the plug.

2. The battery pack module of claim 1, wherein each case of the plurality of battery packs each comprise vent holes corresponding to the batteries.

3. The battery pack module of claim l, wherein each case of the plurality of battery packs each comprise:
an upper case and a lower case that are detachably coupled together
a coupling rib having an asymmetric shape, disposed on one of the upper and lower cases; and
a coupling groove formed in the other of the upper and lower cases, to receive the coupling rib.

4. The battery pack module of claim 3, wherein in each case:
the coupling rib has a height that increases from a first side to a second side of the case; and
the coupling groove has a depth that increases from the first side to the second side of the case, such that the coupling rib may be fully inserted into the coupling groove.

5. The battery pack module of claim 1, wherein each battery pack further comprises a thermistor wire to directly connect to the connector and transmit an internal temperature signal of the case to the connector.

6. The battery pack module of claim 5, wherein the thermistor wire is directly connected to a thermistor.

7. The battery pack module of claim 2, wherein the vent holes comprise a plurality of vent holes each corresponding to one of the plurality of batteries.

8. The battery pack module of claim 3, wherein the coupling rib extends the length of the one of the upper and lower cases.

9. The battery pack module of claim 1, wherein the data wire has a ring terminal coupled to the electrode tab using screws.

10. The battery pack module of claim 1, wherein the data wire is soldered to the electrode tab.

11. The battery pack module of claim 1, wherein the case is in direct contact with the plurality of batteries.

12. The battery pack module of claim 2, wherein the plurality of batteries are in direct contact with external air through the vent holes.

* * * * *